United States Patent
Matsumura

(10) Patent No.: US 10,183,454 B2
(45) Date of Patent: Jan. 22, 2019

(54) CYLINDRICAL-MEMBER FORMING METHOD AND DEVICE

(71) Applicant: c/o The Yokohama Rubber Co., LTD., Minato-ku, Tokyo (JP)

(72) Inventor: Kensuke Matsumura, Oiwake (JP)

(73) Assignee: The Yokohama Rubber Co., LTD. (JP)

(*) Notice: Subject to any disclaimer, the term of this patent is extended or adjusted under 35 U.S.C. 154(b) by 0 days.

(21) Appl. No.: 15/310,090

(22) PCT Filed: May 8, 2015

(86) PCT No.: PCT/JP2015/063333
§ 371 (c)(1),
(2) Date: Nov. 9, 2016

(87) PCT Pub. No.: WO2015/170748
PCT Pub. Date: Nov. 12, 2015

(65) Prior Publication Data
US 2017/0274607 A1 Sep. 28, 2017

(30) Foreign Application Priority Data
May 9, 2014 (JP) .................... 2014-097995

(51) Int. Cl.
*B32B 41/00* (2006.01)
*B29D 30/30* (2006.01)

(52) U.S. Cl.
CPC .......... *B29D 30/30* (2013.01); *B29D 30/3007* (2013.01); *B29D 2030/3064* (2013.01)

(58) Field of Classification Search
CPC ................. B29D 30/30; B29D 2030/3064
(Continued)

(56) References Cited

U.S. PATENT DOCUMENTS

| 2005/0000626 A1* | 1/2005 | Auclair ............. B29D 30/42 156/123 |
| 2009/0260744 A1 | 10/2009 | Bobinger et al. |
| 2013/0009078 A1 | 1/2013 | Inoue et al. |

FOREIGN PATENT DOCUMENTS

| CN | 102233685 | 11/2011 |
| CN | 103569713 | 2/2014 |

(Continued)

OTHER PUBLICATIONS

International Search Report for International Application No. PCT/JP2015/063333 dated Jun. 16, 2015, 4 pages, Japan.

*Primary Examiner* — Michael N Orlando
*Assistant Examiner* — Joshel Rivera
(74) *Attorney, Agent, or Firm* — Thorpe Norton & Western

(57) ABSTRACT

Provided are a method and device for forming a cylindrical member for accurately forming belt-like members into a cylindrical shape without meandering. A pre-winding position sensor detects a position of a member reference line extending in a longitudinal direction of a belt-like member along the entire length of the belt-like member in the longitudinal direction thereof before the belt-like member is placed on a transport conveyor belt, transported to a forming drum, and wound around the forming drum. The belt-like member is wound around the forming drum and formed in a cylindrical shape while the forming drum is relatively moved in the drum width direction with respect to the transport conveyor belt by a controller and the member reference line, based on the detected data and a position data of the drum reference line orthogonal to the drum axial center of the forming drum.

8 Claims, 4 Drawing Sheets

(58) Field of Classification Search
USPC .......................... 156/64, 350, 351, 378, 379
See application file for complete search history.

(56) References Cited

FOREIGN PATENT DOCUMENTS

| | | |
|---|---|---|
| EP | 0 376 357 | 7/1990 |
| JP | H05-229032 | 9/1993 |
| JP | H11-090998 | 4/1999 |
| JP | 2001-113610 | 4/2001 |
| JP | 2004-009091 | 1/2004 |
| JP | 2009-533246 | 9/2009 |
| JP | 2009-226817 | 10/2009 |
| JP | 2013-015455 | 1/2013 |
| KR | 2008-0102240 | 11/2008 |
| WO | WO 2007/118688 | 10/2007 |
| WO | WO 2012/019580 | 2/2012 |

* cited by examiner

CYLINDRICAL-MEMBER FORMING METHOD AND DEVICE

TECHNICAL FIELD

The present technology relates to a method and device for forming a cylindrical member, and more particularly, to a method and device for forming a cylindrical member which can accurately form belt-like members into a cylindrical shape without meandering.

BACKGROUND ART

In the manufacturing steps of rubber products such as tires, a belt-like belt member made of a plurality of steel cords disposed side by side at a predetermined cord angle and covered with a rubber is used. The belt member is formed by cutting disposed steel cords side by side covered with a rubber at the predetermined angle set in accordance with the cord angle at a predetermined length, and bonding together the plurality of members that are cut (for example, see Japanese Unexamined Patent Application Publication No. 2009-226817A). The belt-like belt member is wound around a forming drum and formed in a cylindrical shape. Further, a tread rubber forming a tire tread is formed cylindrically by a belt-like unvulcanized rubber being wound around the forming drum.

When the belt-like belt member and the belt-like unvulcanized rubber are wound around the forming drum in meandering form, a cylindrical member having distortion in the drum width direction is formed. Manufacturing tires using the distorted cylindrical member makes it difficult to ensure consistent quality. Thus, it is important to accurately wind the belt-like member around the forming drum without meandering to form the belt-like member in a cylindrical shape.

SUMMARY

The present technology provides a method and device for forming a cylindrical member in which belt-like members can be accurately formed into a cylindrical shape without meandering.

A method of forming a cylindrical member is a method of forming a cylindrical member by transporting a belt-like member placed on a transport conveyor belt to a forming drum and winding the belt-like member around the forming drum to form the belt-like member in a cylindrical shape, the method including the steps of: detecting a position of a member reference line by a pre-winding position sensor before winding the belt-like member around the forming drum, the member reference line extending in a longitudinal direction of the belt-like member along the entire length of the belt-like member in the longitudinal direction thereof; and forming the belt-like member in a cylindrical shape by winding the belt-like member around the forming drum while the forming drum is relatively moved in a drum width direction with respect to the transport conveyor belt by a controller and the member reference line and a drum reference line are matched, on the basis of detection data by the pre-winding position sensor and position data of the drum reference line orthogonal to a drum axial center of the forming drum and set in a predetermined position in the drum width direction.

A forming device for forming a cylindrical member of the present technology is a forming device for forming a cylindrical member including a transport conveyor belt that transports a belt-like member placed thereon and a forming drum that winds the belt-like member that is transported to form the belt-like member in a cylindrical shape. The forming device includes a pre-winding position sensor that detects a position of a member reference line extending in a longitudinal direction of the belt-like member, placed on the transport conveyor belt, along the entire length of the belt-like member in the longitudinal direction thereof; and a controller to which the data detected by the pre-winding position sensor is input. The belt-like member is formed in a cylindrical shape by winding the belt-like member around the forming drum while the forming drum is relatively moved in a drum width direction with respect to the transport conveyor belt by the controller and the member reference line and a drum reference line are matched, on the basis of detection data by the pre-winding position sensor and position data of the drum reference line orthogonal to a drum axial center of the forming drum and set in a predetermined position of the drum width direction, the position data of the drum reference line being previously input to the controller.

According to the present technology, the belt-like member can be accurately formed in a cylindrical shape without meandering, because the belt-like member is wound around the forming drum and formed in a cylindrical shape while the forming drum is relatively moved in the drum width direction with respect to the transport conveyor belt by the controller and the member reference line and the drum reference line are matched, on the basis of the position data of the member reference line drawn on the belt-like member placed on the transport conveyor belt and the position data of the drum reference line orthogonal to the drum axial center of the forming drum and set in the predetermined position in the drum width direction. With the above, manufacturing tires using the above formed cylindrical member can have consistent quality.

Here, when another belt-like member is laminated and wound around an outer peripheral surface of the cylindrical member to form the other belt-like member in a cylindrical shape, the pre-winding position sensor detects a position of a member reference line before winding the other belt-like member around the outer peripheral surface of the cylindrical member, the member reference line extending in a longitudinal direction of the other belt-like member along the entire length of the other belt-like member in the longitudinal direction thereof; and the other belt-like member can be wound while the forming drum is relatively moved in the drum width direction with respect to the transport conveyor belt by the controller and the member reference line drawn on the other belt-like member and the member reference line drawn on the cylindrical member are matched, on the basis of detection data of the other belt-like member by the pre-winding position sensor and position data of the member reference line drawn on the cylindrical member. The above method enables other belt-like members that are subsequently laminated to be formed accurately in a cylindrical shape without meandering with respect to the cylindrical member formed on the forming drum and shifting each belt-like member in the width direction.

A post-winding position sensor can also detect the position of the member reference line drawn on the cylindrical member, and the position of the member reference line drawn on the cylindrical member can also be acquired on the basis of the detection data. In this case, since the position of the member reference line drawn on the cylindrical member winding around the forming drum can be detected, the position of the member reference line drawn on the cylindrical member can be acquired with even higher precision.

Further, when winding the belt-like member around the forming drum, the controller can also store the position data of the member reference line on the belt-like member, and the position of the member reference line drawn on the cylindrical member can also be acquired on the basis of the stored position data. In this case, a sensor for detecting the position of the member reference line drawn on the cylindrical member winding around the forming drum does not need to be newly provided.

DETAILED DESCRIPTION

Figure 1:
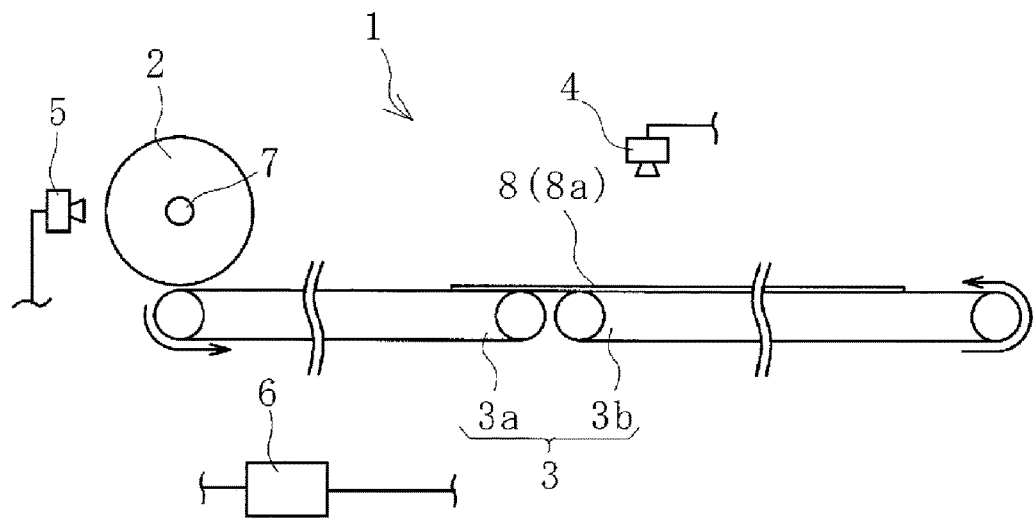
FIG. 1 is a diagram illustrating a forming device for forming a cylindrical member of the present technology in a side view.

A method and device for forming a cylindrical member of the present technology will be described on the basis of the embodiments illustrated in the diagrams as follows.

A forming device 1 for forming a cylindrical member of the present technology illustrated in FIGS. 1 and 2 (hereinafter, the forming device 1) forms belt-like members 8 (8a, 8b) as a cylindrical member 9. Examples of the belt-like member 8 include a belt member used as a reinforcing member for a rubber product such as tires, and various rubber extruded members such as a tread rubber and a side rubber for pneumatic tires. The belt member is a member in which a plurality of steel cords disposed at a predetermined cord angle are covered with a rubber.

The belt-like members 8a and 8b have member reference lines L1 and L2, respectively, extending in the longitudinal direction of each of the belt-like members 8a and 8b along the entire length of each of the belt-like members 8a and 8b in the longitudinal direction thereof. For instance, the member reference lines L1 and L2 are drawn on the center position in the width direction of the belt-like members 8a and 8b, respectively. Each of member reference lines L1 and L2 can be drawn on any width direction position of the belt-like members 8a and 8b given that both lines indicate positions to match each other. Examples of the member reference lines L1 and L2 include a projecting line, or a grooved line formed on each of belt-like members 8a and 8b, or a colored line applied on the same.

The forming device 1 includes a transport conveyor belt 3 that transports the belt-like member 8 placed thereon, a forming drum 2 that winds and forms the transported belt-like member 8 into a cylindrical shape, a pre-winding position sensor 4 that detects the positions of the member reference lines L1 and L2 drawn on the belt-like member 8, and a controller 6 to which data detected by the pre-winding position sensor 4 is input. In this embodiment, the forming device 1 further includes a post-winding position sensor 5 that detects the position of the member reference lines L1 and L2 drawn on the cylindrical member 9. The detection data by the post-winding position sensor 5 is also input to the controller 6. An example of the pre-winding position sensor 4 and the post-winding position sensor 5 includes a camera capable of acquiring captured image data.

In this embodiment, two transport conveyor belts 3a and 3b are connected in series. The transport conveyor belt 3a arranged at the front side in the transport direction extends to the lower position of the forming drum 2. The transporting direction of the transport conveyor belt 3 is orthogonal to the drum axial center DX of the forming drum 2.

The pre-winding position sensor 4 is, for example, arranged at a position above the transport conveyor belts 3a and 3b and in close proximity to a position between the transport conveyor belts 3a and 3b. The post-winding position sensor 5 is arranged with its detection unit facing to the peripheral surface of the forming drum 2.

The forming drum 2 has a cylindrical shape and includes a movement mechanism 7 that moves the forming drum 2 in the drum width direction. A hydraulic cylinder and the like can be used as the movement mechanism 7. The controller 6 controls the movement of the movement mechanism 7. The forming drum 2 may be fixed in the predetermined position and the transporting conveyor 3a may be moved in the drum width direction by the movement mechanism 7.

The position data of the drum reference line DL is input to the controller 6 in advance. The drum reference line DL is set in the predetermined position in the drum width direction and is orthogonal to the drum axial center DX of the forming drum 2. The drum reference line DL is, for example, set in the center position of the drum width direction. The drum reference line DL can be set in any positions in the drum width direction. The controller 6 controls the rotation speed of the forming drum 2, and the transport speed of the transport conveyor belt 3.

Next, an example of the steps of forming a cylindrical member of the present technology will be described.

Figure 2:
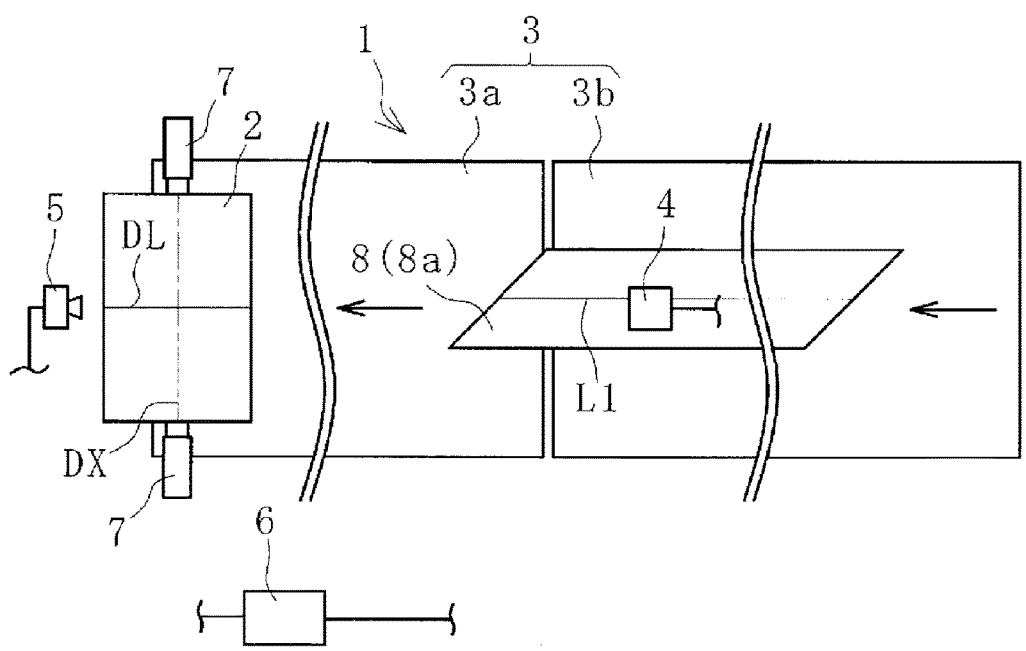
FIG. 2 is a diagram illustrating the forming device in FIG. 1 in a plan view.

As illustrated in FIG. 1 and FIG. 2, two of the transport conveyor belts 3 are synchronously moved at the identical transport speed to move the belt-like member 8a from the rear side transport conveyor belt 3b to the front side transport conveyor belt 3a. During the movement, the pre-winding position sensor 4 detects the position of the member reference line L1 extending in the longitudinal direction of the belt-like member 8a, placed on the transport conveyor belt 3, along the entire length of the belt-like member 8a in the longitudinal direction thereof.

Figure 3:
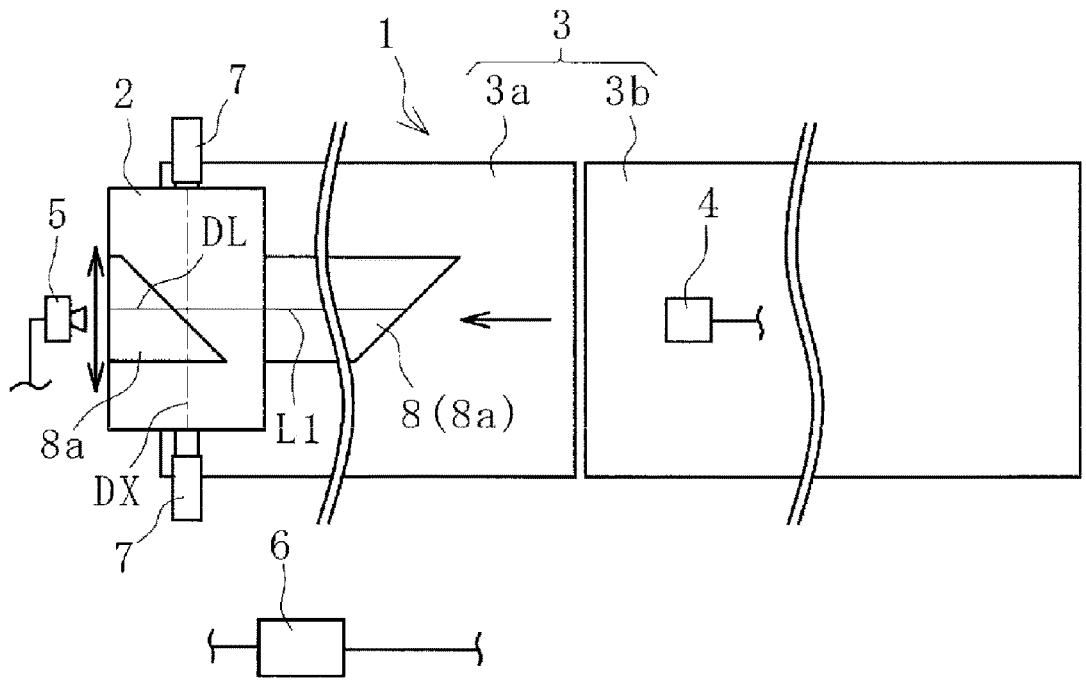
FIG. 3 is a diagram illustrating the step of winding a belt-like member around a forming drum in a plan view.

Next, as illustrated in FIG. 3, the transport speed of the transport conveyor belt 3a and the circumferential speed of the forming drum 2 at the outer peripheral surface are set to the same speed during operation, and, as a result, the belt-like member 8a moved by the transport conveyor belt 3a is moved and wound so that the belt-like member 8a is transferred on the outer peripheral surface of the forming drum 2. During the above operation, on the basis of data detected by the pre-winding position sensor 4 (the position data of the member reference line L1) and the position data of the drum reference line DL, the controller 6 controls the movement mechanism 7 to move the forming drum 2 in the drum width direction with respect to the transport conveyor belt 3a.

Figure 4:
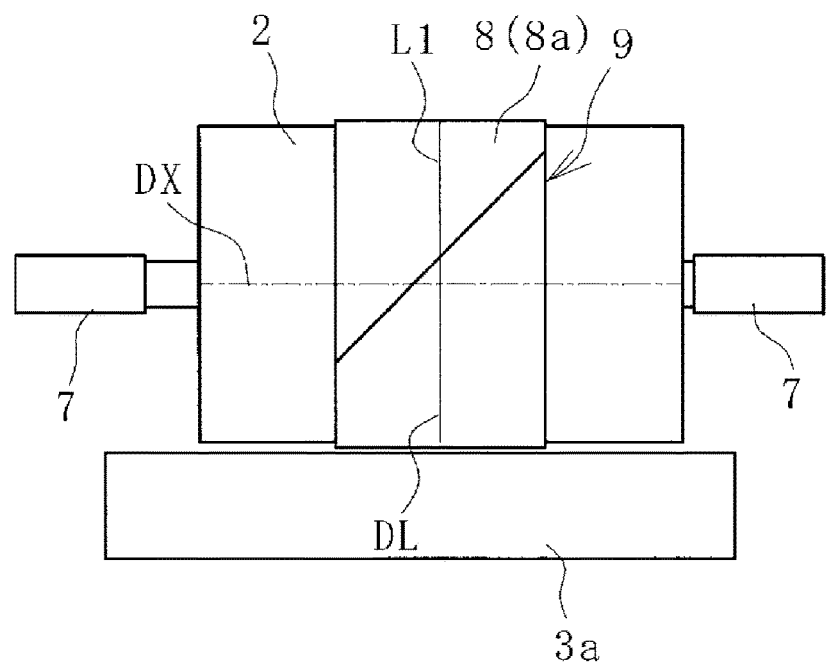
FIG. 4 is a diagram illustrating a cylindrical member in which a belt-like member is formed in a cylindrical shape in a front view of a drum.

As a result of the above described control by the controller 6, the belt-like member 8a is wound around the forming drum 2 to form the cylindrical member 9 as illustrated in FIG. 4 while the position of the member reference line L1 and the position of the drum reference line DL are matched in the drum width direction, and the belt-like member 8a is wound around the forming drum 2. The member reference line L1 is a reference when winding the belt-like member 8a around the forming drum 2.

The drum reference line DL is a straight line orthogonal to the drum axial center DX of the forming drum 2. Thus, even if the belt-like member 8a (the member reference line L1) meanders before winding around the forming drum 2, the belt-like member 8a can be accurately formed into a cylindrical shape without meandering by winding the belt-like member 8a around forming drum 2 while the member reference line L1 and the drum reference line DL are matched. With the above method, tires manufactured using the formed cylindrical member 9 excel in terms of uniformity and can have consistent quality.

Next, an example of the steps of forming another belt-like member 8a in a cylindrical shape by laminating and winding another belt-like member 8b around the outer peripheral surface of the formed cylindrical member 9 will be described.

Figure 5:
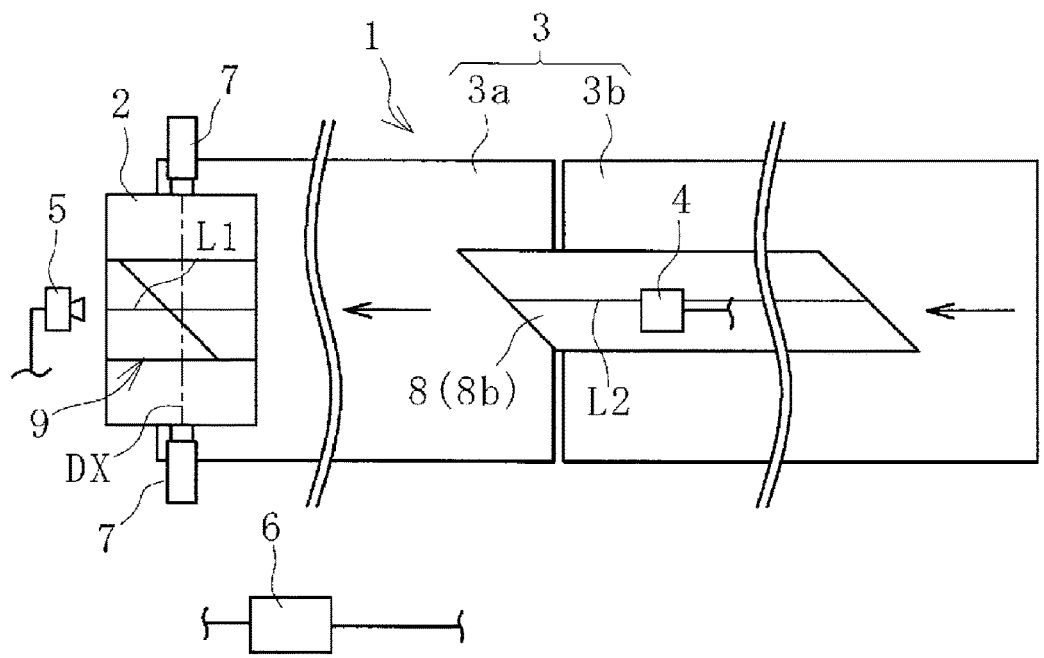
FIG. 5 is a diagram illustrating the status in which another belt-like member to be wound around the outer peripheral surface of the cylindrical member is placed on a transport conveyor belt in a plan view.

As illustrated in FIG. 5, two of the transport conveyor belts 3 are synchronically moved at the identical transport speed to move the belt-like member 8b from the rear side transport conveyor belt 3b to the front side transport conveyor belt 3a. During the movement, the pre-winding position sensor 4 detects the width direction position of the member reference line L2 extending in the longitudinal direction of the belt-like member 8b, placed on the transport conveyor belt 3, along the entire length of the belt-like member 8b in the longitudinal direction thereof.

Figure 6:
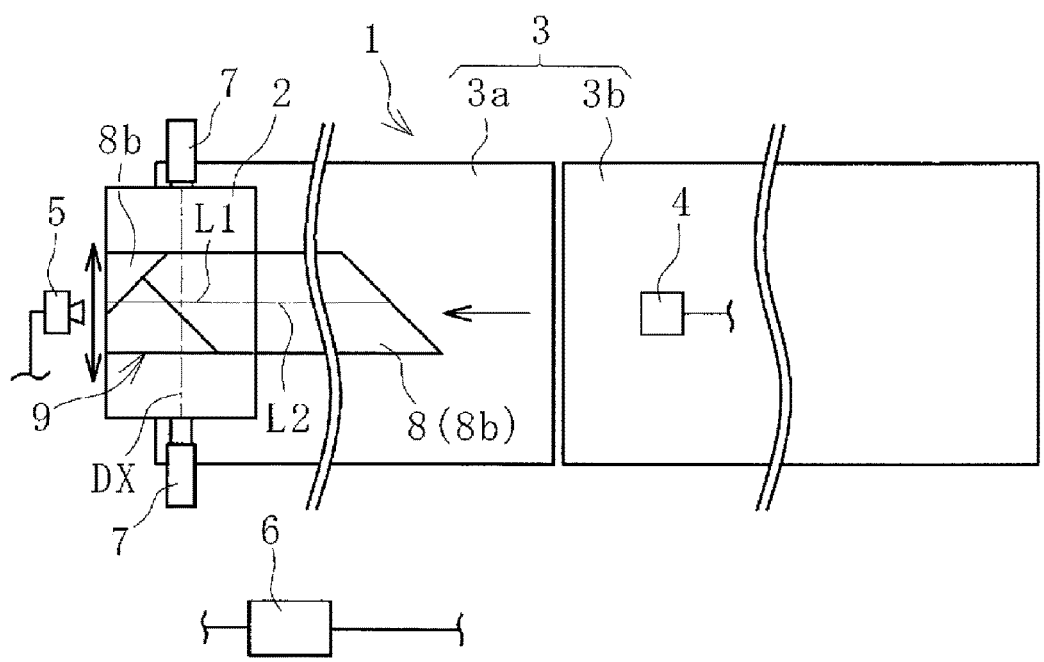
FIG. 6 is a diagram illustrating the step of winding the other belt-like member in FIG. 5 around the forming drum in a plan view.

Next, as illustrated in FIG. 6, the transport speed of the transport conveyor belt 3a and the circumferential speed of the forming drum 2 at the outer peripheral surface are set to the same speed for operation, and, as a result, the belt-like member 8b moved to the transport conveyor belt 3a is moved and wound so that the belt-like member 8b is transferred on the outer peripheral surface of the cylindrical member 9. Further, more preferably, the transport speed of the transport conveyor belt 3a and the circumferential speed of the cylindrical member 9 at the outer peripheral surface are set to the same speed for operation, and, as a result, the belt-like member 8b moved to the transport conveyor belt 3a is moved and wound so that the belt-like member 8b is transferred on the outer peripheral surface of the cylindrical member 9. That is, the controller 6 calculates the circumferential speed at the outer peripheral surface of the outward positioned surface of the cylindrical member 9 on the basis of a thickness of the belt-like member 8a from the forming drum 2, and the forming drum 2 is rotated at the calculated circumferential speed.

When winding the belt-like member 8b around the outer peripheral surface of the cylindrical member 9, the controller 6 controls the movement mechanism 7 to move the forming drum 2 in the drum width direction with respect to the transport conveyor belt 3a, on the basis of the data of the belt-like member 8b detected by the pre-winding position sensor 4 (the position data of the member reference line L2) and the member reference line L1 drawn on the cylindrical member 9.

Figure 7:
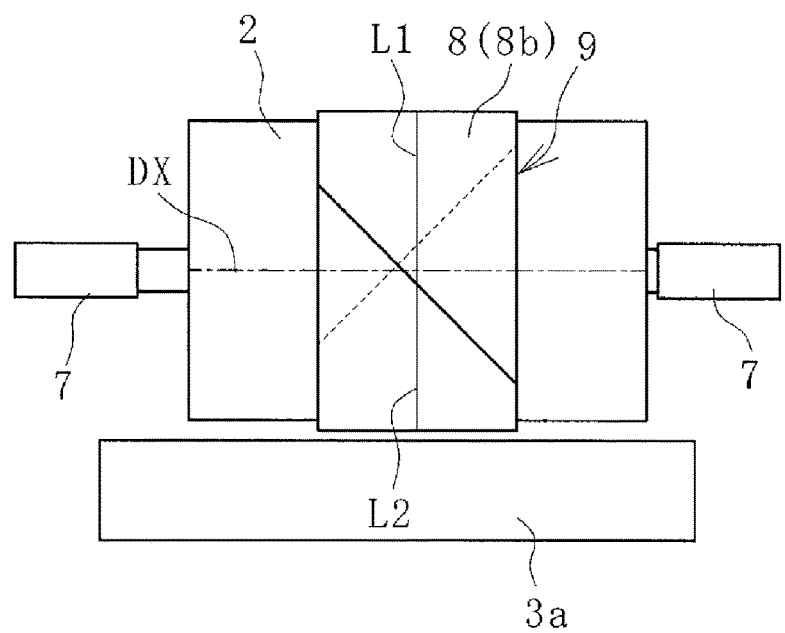
FIG. 7 is a diagram illustrating the status in which another belt-like member is laminated and wound around the outer peripheral surface of the cylindrical member in a front view of the drum.

As a result of the above described control by the controller 6, the belt-like member 8b is wound around the forming drum 2 to form the belt-like member 8b in a cylindrical shape illustrated in FIG. 7 while the position of the member reference line L2 and the position of the member reference line L1 drawn on the cylindrical member 9 are matched in the drum width direction, and the belt-like member 8b is wound around the forming drum 2. The member reference line L2 is a reference when winding the belt-like member 8b around the forming drum 2.

Since, in some cases, the cylindrical member 9 may be wound with slight meandering to the forming drum 2, another belt-like member 8b may meander when the belt-like member 8b is wound around the cylindrical member 9 using the forming drum 2 as a reference. Also, a malfunction may possibly happen in which another belt-like member 8b is wound being offset in the width direction from the predetermined position set in advance with respect to the belt-like member 8a. However, in this embodiment, since the position data of the member reference line L1 drawn on the cylindrical member 9 is used as a reference when winding another belt-like member 8b, the embodiment enables another belt-like member 8b that is subsequently laminated to be formed accurately in a cylindrical shape without meandering with respect to the cylindrical member 9 and shifting (offsetting) each belt-like member in the width direction.

The position of the member reference line L1 drawn on the cylindrical member 9 is acquired on the basis of data detected by the post-winding position sensor 5 detecting the position of the member reference line L1 drawn on the cylindrical member 9. In this case, because the position of the member reference line L1 drawn on the cylindrical member 9, which winds around the forming drum 2, is directly detected, the position of the member reference line L1 drawn on the cylindrical member 9 can be acquired with even higher precision.

Other methods of acquiring the position of the member reference line L1 drawn on the cylindrical member 9 may be applied. For instance, when winding the belt-like member 8a around the forming drum 2, the controller 6 stores the position data of the member reference line L1 drawn on the belt-like member 8a. That is, the controller 6 stores the position (in the drum width direction and circumferential direction position) of the member reference line L1 with respect to the forming drum 2 upon winding the belt-like member 8a around the forming drum 2 as the position of the member reference line L1 drawn on the cylindrical member 9. Then, the position of the member reference line L1 drawn on the cylindrical member 9 is acquired on the basis of the stored position data of the member reference line L1. In this case, the post-winding position sensor 5 is unnecessary.

The above described steps of forming the belt-like member 8b in a cylindrical shape can be applied when yet another belt-like member is laminated and wound around the outer peripheral surface of the belt-like member 8b to form the belt-like member in a cylindrical shape. For instance, the present technology can be applied to the pneumatic tires manufacturing step when forming belt member in a cylindrical shape.

That is, at first, a first layer belt-like belt member (the belt-like member 8a) is wound around the forming drum 2 to form the cylindrical member 9, and a second layer belt-like belt member (the belt-like member 8b) is wound around the outer peripheral surface of the cylindrical member 9 to form it in a cylindrical shape, and, in the next, a belt-like tread rubber is wound around the outer peripheral surface of the cylindrical member 9 formed by forming the second layer belt-like belt member in a cylindrical shape to form it in a cylindrical shape.

The invention claimed is:

1. A method of forming a cylindrical member by transporting a belt member placed on a transport conveyor belt to a forming drum and winding the belt member around the forming drum to form the belt member in a cylindrical shape, the method comprising the steps of:
   detecting a position of a member reference line by a pre-winding position sensor before winding the belt member around the forming drum, the member reference line extending in a longitudinal direction of the belt member along an entire length of the belt member in the longitudinal direction thereof; and
   forming the belt member in a cylindrical shape by winding the belt member around the forming drum while the forming drum is relatively moved in a drum width direction with respect to the transport conveyor belt by a controller and the member reference line and a drum reference line are matched, on a basis of data detected by the pre-winding position sensor and position data of the drum reference line orthogonal to a drum axial center of the forming drum and set in a predetermined position in the drum width direction.

2. The method of forming a cylindrical member according to claim 1, wherein, when another belt member is laminated and wound around an outer peripheral surface of the cylindrical member to form the another belt member in a cylindrical shape, the pre-winding position sensor detects a position of a member reference line before winding the another belt member around the outer peripheral surface of the cylindrical member, the member reference line extending in a longitudinal direction of the another belt member along the entire length of the another belt member in the longitudinal direction thereof; and the another belt member is wound while the forming drum is relatively moved in the drum width direction with respect to the transport conveyor belt by the controller and the member reference line drawn on the another belt member and the member reference line drawn on the cylindrical member are matched, on a basis of detection data of the another belt member by the pre-winding position sensor and position data of the member reference line drawn on the cylindrical member.

3. The method of forming a cylindrical member according to claim 2, wherein a post-winding position sensor detects the position of the member reference line drawn on the cylindrical member, and the position of the member reference line drawn on the cylindrical member is acquired on the basis of the detection data.

4. The method of forming the cylindrical member according to claim 2, wherein the controller stores the position data of the member reference line on the belt member upon winding the belt member around the forming drum, and the position of the member reference line drawn on the cylindrical member is acquired on a basis of the stored position data.

5. A forming device for forming a cylindrical member including a transport conveyor belt that transports a belt member placed thereon and a forming drum that winds the belt member that is transported to form the belt member in a cylindrical shape, the forming device comprising:
   a pre-winding position sensor that detects a position of a member reference line extending in a longitudinal direction of the belt member, placed on the transport conveyor belt, along an entire length of the belt member in the longitudinal direction thereof; and
   a controller to which data detected by the pre-winding position sensor is input,
   wherein the belt member is formed in a cylindrical shape by winding the belt member around the forming drum while the forming drum is relatively moved in a drum width direction with respect to the transport conveyor belt by the controller and the member reference line and a drum reference line are matched, on a basis of detection data by the pre-winding position sensor and position data of the drum reference line orthogonal to a drum axial center of the forming drum and set in a predetermined position of the drum width direction, the position data of the drum reference line being previously input to the controller.

6. The device for forming a cylindrical member according to claim 5, wherein the pre-winding position sensor detects a position of a member reference line extending in a longitudinal direction of another belt member placed on the transport conveyor belt along the entire length of the another belt member in the longitudinal direction thereof on a basis of data of the another belt member detected by the pre-winding position sensor and position data of the member reference line drawn on the cylindrical member, the another belt member being laminated and wound around an outer peripheral surface of the cylindrical member, the member reference line drawn on the another belt member and the member reference line drawn on the cylindrical member being matched by moving the forming drum relatively in the drum width direction with respect to the transport conveyor belt by the controller.

7. The device of forming a cylindrical member according to claim 6, wherein the device is provided with a post-winding position sensor that detects the position of the member reference line drawn on the cylindrical member, and is configured to acquire the position of the member reference line drawn on the cylindrical member on the basis of the data detected by the post-winding position sensor.

8. The device for forming a cylindrical member according to claim 6, wherein the controller stores the position data of the member reference line on the belt member, and the position of the member reference line drawn on the cylindrical member is acquired on the basis of the stored position data.

* * * * *